(12) United States Patent
Allexi et al.

(10) Patent No.: US 10,730,515 B2
(45) Date of Patent: Aug. 4, 2020

(54) METHOD FOR ADJUSTING AN AUTO-BRAKING SYSTEM OVERRIDE THRESHOLD

(71) Applicant: FORD GLOBAL TECHNOLOGIES, LLC, Dearborn, MI (US)

(72) Inventors: Gregor Allexi, Bornheim (DE); Daniel Blickheuser, Cologne NRW (DE); Florian Schweter, Essen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 15/993,076

(22) Filed: May 30, 2018

(65) Prior Publication Data

US 2018/0354515 A1 Dec. 13, 2018

(30) Foreign Application Priority Data

Jun. 12, 2017 (DE) .......... 10 2017 209 846

(51) Int. Cl.
*B60W 30/14* (2006.01)
*B60W 30/09* (2012.01)
(Continued)

(52) U.S. Cl.
CPC .......... *B60W 30/146* (2013.01); *B60W 10/04* (2013.01); *B60W 10/184* (2013.01);
(Continued)

(58) Field of Classification Search
CPC .................................................. B60W 30/146
See application file for complete search history.

(56) References Cited

U.S. PATENT DOCUMENTS 4,460,860 A * 7/1984 Schwesig ............ H02P 21/0003
318/721
6,244,373 B1 * 6/2001 Kojo ...................... B62D 5/008
180/443
(Continued)

FOREIGN PATENT DOCUMENTS

DE 2900461 A1 7/1980
DE 10035035 A1 1/2002
(Continued)

OTHER PUBLICATIONS

DE Examination Report for DE 10 2017 209 846.5 dated Jan. 29, 2018, 6 pages.

*Primary Examiner* — Alex C Dunn
(74) *Attorney, Agent, or Firm* — Frank Lollo; Brooks Kushman P.C.

(57) ABSTRACT

A method of operating an auto-braking system of a vehicle in coordination with operation of a speed limiting system (SLS) of the vehicle to prevent undesired loss of auto-braking functionality. If: a) a driver input of an engine power control parameter (such as throttle setting) exceeds an activation threshold of the SLS so that the SLS is therefore limiting vehicle speed to a set-speed corresponding to the activation threshold; and b) the driver input of the power control parameter is below a SLS override threshold; and c) the SLS override threshold exceeds an auto-braking override threshold for the power control parameter; then the auto-braking override threshold is increased to at least equal the SLS override threshold. The speed limiter activation threshold may be determined from speed limit information supplied by a vehicle navigation system of by an image evaluating unit from images obtained by a camera of the vehicle.

11 Claims, 2 Drawing Sheets

(51) Int. Cl.
*B60W 10/04* (2006.01)
*B60W 10/184* (2012.01)
*B60W 30/18* (2012.01)
*B60W 50/08* (2020.01)
*B60W 50/00* (2006.01)

(52) U.S. Cl.
CPC ...... *B60W 30/09* (2013.01); *B60W 30/18109* (2013.01); *B60W 50/085* (2013.01); *B60W 2050/0073* (2013.01); *B60W 2050/0085* (2013.01); *B60W 2050/0094* (2013.01); *B60W 2540/103* (2013.01); *B60W 2555/60* (2020.02); *B60W 2556/50* (2020.02); *B60W 2720/10* (2013.01)

(56) References Cited

U.S. PATENT DOCUMENTS

| | | | |
|---|---|---|---|
| 6,789,009 B2* | 9/2004 | Schmitz | B60W 30/146 |
| | | | 701/93 |
| 7,059,999 B2 | 6/2006 | Glora et al. | |
| 7,706,954 B2 | 4/2010 | Michi et al. | |
| 9,079,571 B2 | 7/2015 | Trost et al. | |
| 9,308,914 B1 | 4/2016 | Sun et al. | |
| 9,528,834 B2* | 12/2016 | Breed | B60R 21/0132 |
| 2003/0023364 A1* | 1/2003 | Schmitz | B60W 30/146 |
| | | | 701/93 |
| 2011/0077807 A1* | 3/2011 | Hyde | G06Q 30/02 |
| | | | 701/22 |
| 2013/0314503 A1* | 11/2013 | Nix | G06K 9/00805 |
| | | | 348/46 |
| 2015/0166062 A1* | 6/2015 | Johnson | B60W 30/12 |
| | | | 701/41 |
| 2016/0347312 A1* | 12/2016 | Tomatsu | B60W 30/146 |
| 2017/0072955 A1 | 3/2017 | Ediger et al. | |
| 2017/0137057 A1* | 5/2017 | Kitazume | B62D 5/0466 |
| 2017/0183028 A1* | 6/2017 | Kitazume | B62D 5/0466 |
| 2017/0291604 A1* | 10/2017 | Mukkala, II | B60W 30/146 |
| 2018/0033300 A1* | 2/2018 | Hansen | H04B 1/3822 |
| 2018/0059687 A1* | 3/2018 | Hayes | G01C 21/3415 |
| 2018/0215380 A1* | 8/2018 | Devi | B60W 30/143 |

FOREIGN PATENT DOCUMENTS

| | | | | |
|---|---|---|---|---|
| DE | 102012002318 A1 | | 8/2013 | |
| GB | 2350699 A | | 12/2000 | |
| GB | 2417335 B | * | 5/2008 | ........... B60K 31/047 |

* cited by examiner

METHOD FOR ADJUSTING AN AUTO-BRAKING SYSTEM OVERRIDE THRESHOLD

CROSS-REFERENCE TO RELATED APPLICATIONS

This application claims foreign priority benefits under 35 U.S.C. § 119(a)-(d) to DE Application 10 2017 209 846.5 filed Jun. 12, 2017, which is hereby incorporated by reference in its entirety.

TECHNICAL FIELD

The present invention relates to a vehicle having an autonomous braking system and a speed limiter system, both of which may be overridden by a driver input of a power control parameter, such as throttle setting. The invention further relates to a method of adjusting the override threshold the such an autonomous braking system.

BACKGROUND

Automotive vehicles can comprise more than one drive assist system in order to increase the driving comfort/convenience and/or safety.

By way of example, speed limiter systems limit the highest speed of a vehicle to a upper limit, also known as a set-speed. In the case of motor vehicles having an internal combustion engine, it is possible for example to realize this in that the speed limiter system changes the supply of fuel to the engine in that the flow rate of the fuel via the injection pump is adjusted.

The speed limiter system aids the driver of the vehicle to not exceed a set speed even if the gas pedal position would, in the absence of the speed limiter system, cause a motor power that would have led to a higher speed than the set speed.

Autonomous braking driver assist systems or auto-braking systems or pre-collision assist systems operate to identify, via an associated sensor or sensors supplying data to the system, impending accident situations, by way of example potential vehicle collisions for example in that the distance with respect to the vehicle ahead is monitored and said systems ensure that the driver is warned by way of example in a visual or acoustic manner and/or for example if a suitable reaction of the driver, by way of example an actuation of the vehicle brake, is not performed or is not performed to a sufficient extent or is performed too slowly, a brake intervention, in other words an autonomous or auto-braking procedure of the vehicle, is performed automatically by the auto-braking system, by way of example with full braking force.

In the case of most proposed driver assist systems, the driver is able to, by some form of control input, cancel or override the corresponding drive assist function when desired.

DE 100 35 035 discloses that a maximum speed limit that can be set via a manual switch can be overridden, in other words deactivated, when a threshold value is exceeded when the gas pedal is being actuated.

DE 10 2015 122 603 discloses a vehicle that comprises multiple drive assist functions inter alia a collision avoiding system, a lane-keeping assistant and an automatic distance maintaining system. If an abnormal driving situation is identified, the drive assist functions are automatically activated even if the systems have been deactivated by the driver by means of associated switches. Nevertheless, there are possibilities for the driver to override the drive assist systems. The extent to which the gas pedal, in other words the accelerator pedal, is pressed down thus identifies whether the automatic distance maintaining system is to be disabled.

It is therefore known in the prior art that when a speed limiter system is activated it can be deactivated or overridden by the driver actuating the throttle (gas pedal, for instance) beyond or above an established/predetermined speed limiter override threshold value.

It is also known in the prior art that an auto-braking intervention by an autonomous auto-braking system can be disabled or overridden by the driver if, in the driver's judgment, an auto-braking intervention is not the desired reaction in the respective traffic situation. By way of example, overriding the steering, in other words by means of moving the steering wheel, and/or overriding the moving the gas pedal beyond or above an auto-braking override threshold value can be provided as possibilities for overriding the auto-braking procedure.

Previously, no consideration has been made as to how the two systems (SLS and EAB) may interact when both are activated. More specifically, no consideration has been given to the fact that if each of the two systems has an override power control setting, those two override settings may require coordination in order to derive optimum benefit from the system.

SUMMARY

The disclosed method and apparatus provide a functionality with which the safety benefits provided by an auto-braking system of a vehicle are maintained even while a speed limiter system is activated and limiting the speed of the vehicle.

This object is achieved in accordance with the invention with a vehicle having an auto-braking system generating braking interventions that can be overridden by a driver control input and a method for adjusting an auto-braking override threshold value for a vehicle.

The disclosed vehicle renders it possible to adaptively adjust the overriding procedure of the auto-braking system of said vehicle to coordinate with the operating state of a speed limiter system that is likewise associated with the vehicle. The vehicle comprises at least one engine, an auto-braking system designed and operative to autonomously implement an auto-braking intervention of the vehicle and that can be overridden when an auto-braking override threshold value of a control parameter of a power output of the engine that can be changed by the driver of the vehicle is equaled or exceeded. The vehicle further comprises a speed limiter system designed and operative to limit a speed of the vehicle to a maximum speed (the "set-speed") and that can be overridden when a speed limiter override threshold of the control parameter is equaled or exceeded. The auto-braking system is operative to increase the auto-braking override threshold to at least the speed limiter override threshold if the speed limiter system is operating in the active state in which said speed limiter system is actively limiting the vehicle's speed.

This efficient and cost-effective solution offers at least the advantage that if the speed limiter system is active (limiting vehicle speed to the set speed in spite of driver control input that may otherwise cause an increase in speed) while the auto-braking system is also active with an override threshold below the speed limiter system override threshold, the auto-braking override threshold is increased to equal or exceed the speed limiter system override threshold. This prevents a loss of the safety benefits of the auto-braking system that would otherwise occur when the speed limiter system is engaged and the power control parameter (such as driver throttle input) which corresponds to the set speed exceeds the auto-braking override threshold.

The auto-braking override threshold is increased in one embodiment to equal the value of the speed limiter override threshold. In another embodiment, the auto-braking override threshold is increased to a value that lies above the speed limiter override threshold.

The auto-braking system remains unaffected in regard to other ways in which the override may be caused, and said ways are not directly influenced by the operating state of the speed limiter system. By way of example, a movement of the steering wheel to a specific extent or actuating a switch that is provided for this purpose will remain unaffected.

A vehicle can be a motor vehicle but by way of example can also be a rail-borne vehicle. The engine is the drive unit of the vehicle, said engine having a power output that is intended to drive the vehicle, by way of example an internal combustion engine or electric motor.

A driver-alterable control parameter of engine power output can be a throttle setting of the engine as performed by, for example, the position or travel of a gas pedal relative to a resting position or a maximum position. However, the control can also be performed, for example, via a rotary handle or via a joystick.

In a preferred embodiment, the auto-braking system is configured and operative to change the value of auto-braking override threshold to at least the same level as the speed limiter override threshold only if the auto-braking override threshold value is lower than the speed limiter override threshold. In this manner the auto-braking override threshold is only increased when appropriate and is not reduced if it should be higher than the value or setting of speed limiter override threshold.

In one embodiment, the speed limiter system is operative to become active if a speed limiter activating threshold of the control parameter is exceeded. The range in which the speed limiter system is actively limiting the vehicle's speed is thus limited to a range bounded by the speed limiter activating threshold and the speed limiter override threshold.

In one embodiment, the vehicle comprises a throttle pedal for controlling the power output of the engine, and the control parameter is a travel of the pedal relative to a first position of the pedal, said first position corresponding to a minimum effect on the power output of the engine, or to a second position of the pedal, said second position at least when not in the active operating state of the speed limiter system corresponding to a maximum increasing effect on the power output of the engine. The driver can thus override the auto-braking procedure and also the speed limiter using the same control mechanism that the driver intuitively obviously uses for the acceleration.

In the case of a motor vehicle having an internal combustion engine, a pedal can be an accelerator pedal or gas pedal. In the case of an electric vehicle, its "gas pedal" or speed controller may be another lever or a regulator that for example is not operated using the foot but rather using the hand of the driver, for example in the case of a motorcycle. The term "travel" can here stand for the distance specification but by way of example also for the angle of rotation.

Whether the travel relates to the first or the second position of the pedal depends upon the embodiment and it is possible to determine therefrom in which range the relationship between the travel of the pedal and the power output of the engine is particularly clear and consistent over time. For an internal combustion engine, the position of the pedal that corresponds to the maximum increasing effect on the power output of the engine corresponds to a "full throttle" position.

The travel can be an absolute indication of value but also can be a relative indication, by way of example in percent. The travel between the first and the second position of the pedal can thus correspond to 100%.

In one embodiment, the speed limiter override threshold corresponds to a first travel of the pedal relative to the first or to the second position of the pedal. It is thus not necessary by way of example to monitor the power output of the engine itself or the current speed but rather to monitor the current travel of the pedal and compare it to the first travel that is associated with the speed limiter override threshold value rendering it possible to control the speed limiter system.

If the pedal is moved by the driver more than the first travel, in other words above the speed limiter override threshold (that may be, by way of example, at 90% of the travel between the first minimum and the second maximum position of the pedal), the speed limitation procedure is consequently overridden and usually the vehicle is accelerated.

In one exemplary embodiment, the auto-braking override threshold corresponds to a second travel of the pedal relative to the first or to the second position of the pedal. A comparison of the current travel of the pedal to the second travel that is associated with the auto-braking override threshold value can thus be used to control the auto-braking system. If the driver by way of example actuates the pedal during the auto-braking maneuver in such a manner that the pedal exceeds the auto-braking override threshold value (that may lie, by way of example, at 30% of the travel between the first minimum and the second maximum position of the pedal), the auto-braking procedure is thus disabled.

It is thus also possible to realize an adjustment of the auto-braking override threshold value up to the speed limiter override threshold value in a simple manner by means of setting the first and the second travel to be equal so as to override both the auto-braking system and the speed limiter system.

Accordingly, in a further exemplary embodiment the speed limiter activating threshold corresponding to a third travel of the pedal relative to the first or to the second position of the pedal. It is thus likewise possible to identify by means of monitoring the position or the travel of the pedal, whether the speed limiter is to be activated. If the operating situations both of the speed limiter system as well as of the auto-braking system are controlled via the pedal, it is not necessary for the adjustment of the auto-braking override threshold value to ascertain sensor values that indicate the speed of the vehicle or the power output of the engine. A monitoring procedure is performed to establish whether the second travel is smaller than the first but larger than the third and in this case the second travel is changed to the first with the result that it is no longer possible for an undefined state to occur with the result that the auto-braking procedure is actually to be overridden but is not because the speed limiter directly disables the significance of the pedal position.

If by way of example the third travel of the pedal corresponding to the speed limiter activating threshold relative to the first or to the second position of the pedal is set at 50% of the travel between the first/minimum and the second/maximum position of the pedal and the speed limiter override threshold value is at 90%, the speed limiter is thus activated between 50% and 90% and any movement of the pedal by the driver within this range will not result in a change in vehicle speed. If while operating in this state the auto-braking system is engaged and the second travel of the pedal that corresponds to the auto-braking override threshold value is below the current/instantaneous pedal travel, the auto-braking system is effectively disabled since if an auto-braking intervention were triggered it would be instantly overridden. This state is avoided in that the auto-braking override threshold value in this case is increased to the speed limiter override threshold value.

In one embodiment, the vehicle comprises a navigation system and the speed limiter system is configured and operative to adjust the speed limiter activating threshold value in dependence upon speed limiter information of the navigation system. This offers the advantage that the speed limiter activating threshold value is adjusted automatically to the environment in which the vehicle is currently moving. As a consequence, the range in which the sensitivity of the auto-braking system with respect to overriding decisions of the driver by means of raising the auto-braking override threshold value to the speed limiter override threshold value is slightly reduced to the respective required range.

In a still further embodiment, the vehicle comprises a camera sensor and an image evaluating device and the speed limiter system is configured for the purpose of adjusting the speed limiter activating threshold value in dependence upon speed limiter information that is obtained by the image evaluating unit from images that are recorded by the camera sensor. In a manner similar to the evaluation of data of a navigation system, this offers the advantage that the speed limiter activating threshold value is automatically adjusted to the environment in which the vehicle is currently moving, wherein in this case reference is not made or reference is not only made to the navigation system for the speed limiter data that disclose the vehicle position but rather current information is actively obtained from environmental data, by way of example street signs.

Furthermore, the present disclosure relates to a method for adjusting an auto-braking override threshold value for a vehicle that comprises at least one engine, an auto-braking system that is designed to autonomously implement an auto-braking procedure of the vehicle and that can be deactivated when an auto-braking override threshold value of a driver-alterable control parameter of a power output of the engine is exceeded and a speed limiter system operative to limit a speed of the vehicle and that can be deactivated when a speed limiter override threshold value of the control parameter is exceeded. It is provided to monitor an operating state of the speed limiter system and if the monitoring procedure establishes that the speed limiter system is actively limiting a speed of the vehicle to raise the auto-braking override threshold to at least the speed limiter override threshold. In this manner, the advantages and characteristics of the vehicle in accordance with the invention, said vehicle having an auto-braking system that can be adaptively overridden, are also implemented within the scope of a method for adjusting an auto-braking override threshold value for a vehicle.

In a preferred embodiment, the auto-braking override threshold value is only changed if a monitoring procedure establishes that the auto-braking override threshold value is lower than or less than the speed limiter override threshold value.

The method is implemented by way of example with the aid of a logic circuit, a control device, controller or another programmable device that is a part of the auto-braking system or part of the speed limiter system or is connected to or can be connected to said systems. A programmable device comprises by way of example a processor and a storage device, wherein the storage device stores instructions in the form of code pieces that can be performed by the processor in order to implement at least parts of the method in accordance with the invention.

Further advantages of the present invention are evident in the detailed description and the figures. The invention is explained below in conjunction with the following description of exemplary embodiments in relation to the accompanying illustrations. In the drawing:

DETAILED DESCRIPTION

Figure 1:
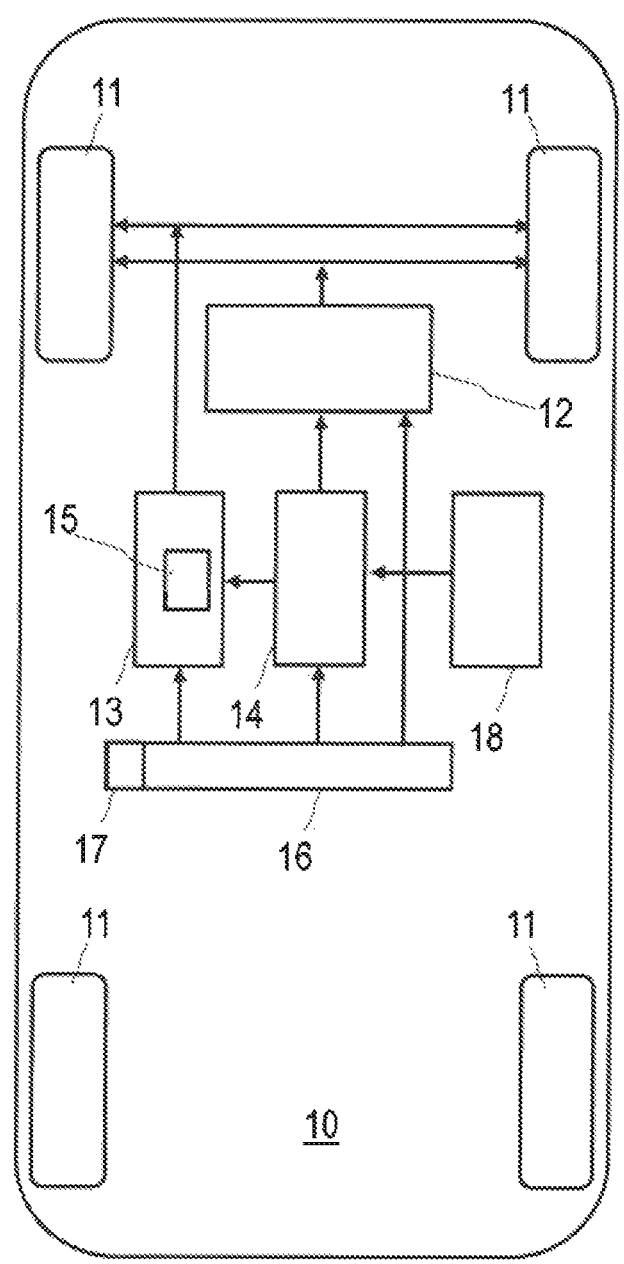
FIG. 1 illustrates schematically a vehicle in accordance with a disclosed embodiment of the invention having an auto-braking system that can be adaptively overridden in an exemplary embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the figures, identical or similar elements are provided with identical reference numerals provided this is expedient.

FIG. 1 illustrates schematically a vehicle in accordance with the invention having an auto-braking system that can be adaptively overridden in an exemplary embodiment. The vehicle 10 comprises an engine 12 and the wheels 11 of the vehicle 10 can be driven using the power output of said engine. This is illustrated in FIG. 1 by means of arrows to two of the four wheels 11. In other embodiments, it is also possible to drive more or fewer wheels by means of the engine 12.

Moreover, the vehicle 10 comprises an auto-braking system 13 that is designed and operative to autonomously implement a braking procedure or intervention and that can be deactivated when a vehicle driver makes an input to a control parameter of a power output of the engine that exceed an auto-braking override threshold value (Limit $E_{OD}$). FIG. 1 illustrates using arrows that the auto-braking system acts upon the brakes of two of the four wheels 11. In another embodiment, the automatic auto-braking system acts upon more or fewer than two wheels 11.

The vehicle 10 further comprises a speed limiter system 14 that is designed and operative to limit a speed of the vehicle 10 and that can be deactivated when a speed limiter override threshold value (Limit $V_{OD}$) of the control parameter is exceeded.

The auto-braking system 13 is configured and operative to change the auto-braking override threshold value to at least the speed limiter override threshold value if the speed limiter system 14 is active in that it is actively limiting a speed of the vehicle 10. The auto-braking system 13 comprises an electronic programmable device or controller 15 operative to evaluate the data of the auto-braking system and state data that is received by the speed limiter system (these data inputs described in further detail below) and to adjust the auto-braking override threshold.

In the embodiment illustrated in FIG. 1, the vehicle 10 comprises a throttle which may be implemented as a pedal 16 for controlling the power output of the engine, and the control parameter is a travel of the pedal 16 relative to a) a first position of the pedal 16, said first pedal position corresponding to a minimum effect on the power output of the engine 12 or to b) a second position of the pedal 16, said second position at least when not in the active operating state of the speed limiter system 14 corresponding to a maximum increasing effect on the power output of the engine 12. If the position of the pedal 16 is ascertained using a pedal position sensor 17, the measured sensor values of said pedal position sensor are transferred to the auto-braking system 13 and the speed limiter system 14. The effect of the pedal 16 on the power output of the engine 12 is illustrated in a greatly simplified manner using a connecting arrow without illustrating the further components that are involved and that in the case of a motor vehicle having an internal combustion engine include by way of example inter alia also a fuel pump, a carburetor, a drive-train and a transmission.

In the embodiment illustrated in FIG. 1 the vehicle 10 further comprises a navigation system 18. The speed limiter system 14 receives speed limit information (recommended and/or regulatory) therefrom, said information being related to the environment or location of the vehicle 10 at a particular time, and is configured and operative to adjust the speed limiter activating threshold value in dependence upon this speed limiter information.

Figure 2:
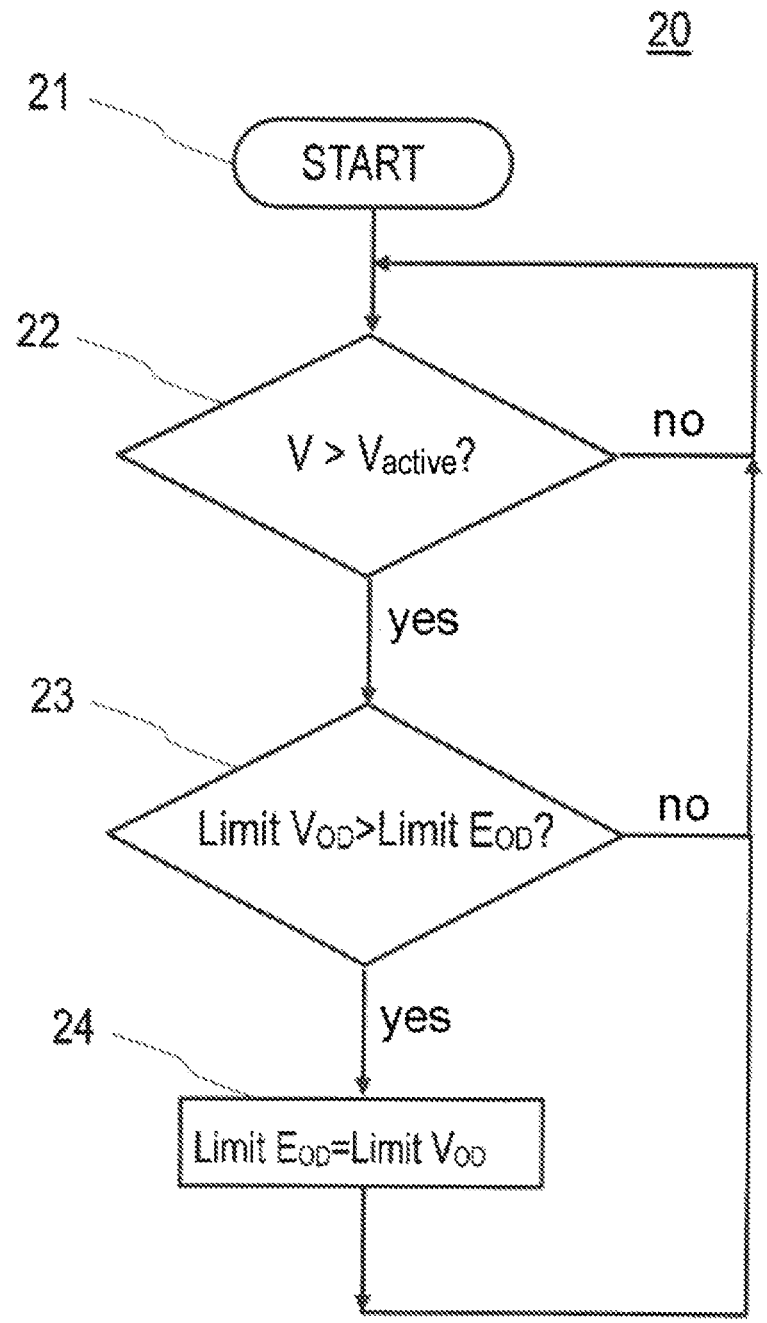
FIG. 2 illustrates schematically a method in accordance with a disclosed embodiment of the invention for adjusting an auto-braking override threshold value for a vehicle in an exemplary embodiment.

FIG. 2 illustrates schematically an associated method 20 in accordance with the invention for adjusting an auto-braking override threshold value for a vehicle in an exemplary embodiment, wherein the vehicle (as illustrated by way of example in FIG. 1) comprises at least one engine, an auto-braking system designed to autonomously implement an auto-braking procedure and that can be deactivated when an auto-braking override threshold (Limit $E_{OD}$) of a control parameter of a power output of the engine that can be changed by a driver of the vehicle is exceeded, and a speed limiter system designed and operative to limit a speed of the vehicle and that can be deactivated when a speed limiter override threshold (Limit $V_{OD}$) of the control parameter is exceeded.

The method 10 comprises monitoring 22 the operating state of the speed limiter system after a start 21. If the monitoring procedure 22 establishes that the speed limiter system is not limiting the speed (V) of the vehicle (step 22, "NO"), the monitoring procedure is continued.

However, if the monitoring procedure of step 22 establishes that the current value (V) of the control parameter being input (or "demanded") by the driver exceeds an activating threshold value ($V_{active}$) of the control parameter (step 22, "YES"), the method progresses to step 23. In the described example wherein throttle pedal travel is the control parameter of engine power output, the condition $V > V_{active}$ equates to a situation wherein the driver's throttle input/demand exceeds the throttle position corresponding to the set-speed established by the speed limiting system, and therefore the speed limiting system is actively limiting the speed of the vehicle and the vehicle speed does not increase beyond the set-speed regardless of further throttle travel.

At step 23, a comparison check is made as to whether the current speed limiter override threshold value (Limit $V_{OD}$) exceeds the auto-braking override threshold (Limit $E_{OD}$). If "YES," the method progresses to step 24 where the auto-braking override threshold (Limit $E_{OS}$) is increased to a level at least equal to the speed limiter override threshold value (Limit $V_{OD}$). In the illustrated embodiment, the auto-braking override threshold is increased to be equal to the speed limiter override threshold (Limit $E_{OD}$=Limit $V_{OD}$).

The comparison of the speed limiter override threshold value (Limit $V_{OD}$) with the auto-braking override threshold value (Limit $E_{OD}$) at step 23 ensures that the auto-braking override threshold value (Limit $E_{OD}$) will only be only be increased (never decreased) in value. If this applies the adjustment is performed, otherwise (step 23, "NO") the method is continued with the procedure of monitoring the activating state.

It is further provided that the method is terminated in the event of the vehicle being deactivated (ignition switched off, for example) or also the speed limiter system and/or the auto-braking system being switched off (by a manual switch actuation or other driver command, for example, since if none of or only one of the two systems are activated, it is not possible for conflict to occur when the systems are being overridden.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of operating an auto-braking system of a vehicle comprising:
   determining that a driver input of a power control parameter exceeds an activation threshold of a vehicle speed limiter system (SLS), and the SLS is therefore limiting vehicle speed to a set-speed corresponding to the activation threshold;
   determining that the driver input of the power control parameter is below a SLS override threshold;
   determining that the SLS override threshold exceeds an auto-braking override threshold for the power control parameter; and
   adjusting the auto-braking system automatically in reaction to the above determinations, by increasing the auto-braking override threshold in the auto-braking system to at least equal the SLS override threshold.

2. The method of claim 1, wherein the power control parameter is a throttle setting of a vehicle engine.

3. The method of claim 1, further comprising adjusting the speed limiter activation threshold in dependence upon speed limit information for a location of the vehicle supplied by a vehicle navigation system.

4. The method of claim 1, further comprising adjusting the speed limiter activation threshold in dependence upon speed limit information for a location of the vehicle supplied by an image evaluating unit from images obtained by a camera of the vehicle.

5. A method of operating an auto-braking system of a vehicle comprising:

determining that a driver input of a power control parameter exceeds a vehicle speed limiter system (SLS) activation threshold and is below a SLS override threshold;

determining that the SLS override threshold exceeds an auto-braking override threshold for the power control parameter; and adjusting the auto-braking system automatically in reaction to the above determinations, by increasing the auto-braking override threshold in the auto-braking system to at least equal the SLS override threshold.

6. The method of claim 5, wherein the power control parameter is a setting of a throttle of a vehicle engine.

7. The method of claim 5, further comprising adjusting the speed limiter activation threshold in dependence upon speed limit information for a location of the vehicle supplied by a vehicle navigation system.

8. The method of claim 5, further comprising adjusting the speed limiter activation threshold in dependence upon speed limit information for a location of the vehicle supplied by an image evaluating unit from images obtained by a camera of the vehicle.

9. A method of operating an auto-braking system comprising:

determining that a) a driver throttle input exceeds a vehicle speed limiter system (SLS) activation throttle setting and is below a SLS override threshold, and b) the SLS override threshold exceeds an auto-braking override threshold; and adjusting the auto-braking system automatically in reaction to a) and b) above, by increasing the auto-braking override threshold in the auto-braking system to at least equal the SLS override threshold.

10. The method of claim 9, further comprising adjusting the speed limiter activation threshold in dependence upon speed limit information for a location of the vehicle supplied by a vehicle navigation system.

11. The method of claim 9, further comprising adjusting the speed limiter activation threshold in dependence upon speed limit information for a location of the vehicle supplied by an image evaluating unit from images obtained by a camera of the vehicle.

\* \* \* \* \*